(12) United States Patent
Gracia Verdugo et al.

(10) Patent No.: US 11,407,221 B2
(45) Date of Patent: Aug. 9, 2022

(54) MAINTAINING A PRINT QUALITY PARAMETER IN A PRINTER

(71) Applicant: Hewlett-Packard Development Company, L.P., Spring, TX (US)

(72) Inventors: Antonio Gracia Verdugo, Sant Cugat del Valles (ES); Joan Uroz Soria, Sant Cugat del Valles (ES); Aleix Fort Filgueira, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 722 days.

(21) Appl. No.: 16/334,249

(22) PCT Filed: Oct. 25, 2016

(86) PCT No.: PCT/US2016/058678
§ 371 (c)(1),
(2) Date: Mar. 18, 2019

(87) PCT Pub. No.: WO2018/080454
PCT Pub. Date: May 3, 2018

(65) Prior Publication Data
US 2019/0224966 A1  Jul. 25, 2019

(51) Int. Cl.
*B29C 64/112* (2017.01)
*B29C 64/20* (2017.01)
(Continued)

(52) U.S. Cl.
CPC ......... *B41J 2/04573* (2013.01); *B29C 64/112* (2017.08); *B29C 64/20* (2017.08);
(Continued)

(58) Field of Classification Search
CPC ..... B29C 64/112; B29C 64/20; B29C 64/393; B33Y 10/00; B33Y 30/00; B33Y 50/02;
(Continued)

(56) References Cited

U.S. PATENT DOCUMENTS

| 5,673,069 A | 9/1997 | Canfield et al. |
| 6,769,759 B2 | 8/2004 | Yamasaki et al. |
| 7,980,652 B2 | 7/2011 | Baba et al. |

(Continued)

FOREIGN PATENT DOCUMENTS

| CN | 1500637 A | 6/2004 |
| CN | 101058255 A | 10/2007 |

(Continued)

OTHER PUBLICATIONS

FAQ'S: Print Quality, Nozzle Checks, ICC Profiles & More, 2011, <http://www.breathingcolor.com/blog/top-5-printmaking-tipstrickstechniques-january-11/>, 8 pages.

(Continued)

*Primary Examiner* — Michael J Brown
(74) *Attorney, Agent, or Firm* — HP Inc. Patent Department

(57) ABSTRACT

A printer includes a print head to print a pixel by ejecting drops of a printing fluid from the print head, and a controller. The controller monitors a drop volume of the printing fluid ejected by the print head. When the drop volume is below a threshold, the controller controls the print head in accordance with a first print mode to increase the frequency of ejecting drops of the printing fluid within the pixel print time with a decrease in the drop volume that maintains a print quality parameter. The controller changes to a second print mode to increase the pixel print time that maintains the print quality parameter.

15 Claims, 5 Drawing Sheets

(51) Int. Cl.
*B41J 2/045* (2006.01)
*B41J 2/21* (2006.01)
*B41J 2/175* (2006.01)
*B33Y 10/00* (2015.01)
*B33Y 30/00* (2015.01)
*B33Y 50/02* (2015.01)
*B29C 64/393* (2017.01)
*B41J 2/04* (2006.01)

(52) U.S. Cl.
CPC ............ *B29C 64/393* (2017.08); *B33Y 10/00* (2014.12); *B33Y 30/00* (2014.12); *B33Y 50/02* (2014.12); *B41J 2/0456* (2013.01); *B41J 2/0458* (2013.01); *B41J 2/04551* (2013.01); *B41J 2/04581* (2013.01); *B41J 2/175* (2013.01); *B41J 2/2132* (2013.01)

(58) Field of Classification Search
CPC .... B41J 2/04551; B41J 2/0456; B41J 2/0458; B41J 2/04581; B41J 2/175; B41J 2/2132
USPC ....................................................... 700/117
See application file for complete search history.

(56) References Cited

U.S. PATENT DOCUMENTS

| | | | |
|---|---|---|---|
| 7,988,247 B2 | 8/2011 | Letendre et al. | |
| 8,668,298 B2 | 3/2014 | Buschmann | |
| 9,205,691 B1* | 12/2015 | Jones | B33Y 10/00 |
| 9,375,963 B2 | 6/2016 | Humet Pous et al. | |
| 2001/0022596 A1 | 9/2001 | Korol | |
| 2003/0081040 A1 | 5/2003 | Therien et al. | |
| 2005/0156960 A1 | 7/2005 | Courian et al. | |
| 2009/0322806 A1* | 12/2009 | Donahue | B41J 2/17513 347/7 |
| 2014/0210889 A1 | 7/2014 | Gracia Verdugo et al. | |
| 2018/0222182 A1* | 8/2018 | Gracia Verdugo | B41J 2/12 |

FOREIGN PATENT DOCUMENTS

| | | |
|---|---|---|
| CN | 105142913 A | 12/2015 |
| CN | 105188934 A | 12/2015 |
| CN | 105339154 A | 2/2016 |
| EP | 0933218 | 8/1999 |
| EP | 1085458 | 3/2001 |

OTHER PUBLICATIONS

HP Pagewide Web Presses: Obtaining Long Printhead Life, Aug. 27, 2015, < http://www8.hp.com/h20195/v2/GetPDF.aspx/4AA6-1111ENW.pdf >, 6 pages.

Printing Images to Match Monitor Colors (iPF9400) (iPF9400S), Jun. 12, 2012, 6 pages.

* cited by examiner

MAINTAINING A PRINT QUALITY PARAMETER IN A PRINTER

BACKGROUND

A printer, for example, an inkjet-printer or a 3-dimensional printer, ejects drops of a printing fluid from a print head. The drop volume of the printing fluid ejected by a print head may vary over the lifetime of the printer.

DETAILED DESCRIPTION

Figure 1:
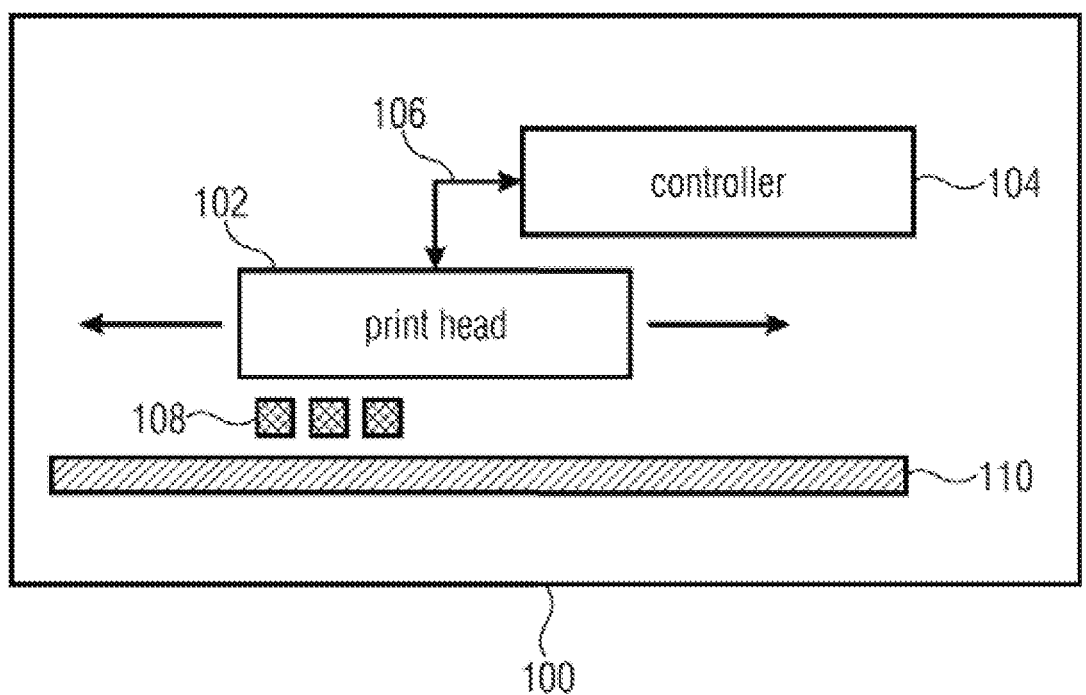
FIG. 1 is a schematic representation of a printer in accordance with an example.

In the following description, details are set forth to provide an understanding of the examples described herein. However, it is to be understood that the examples may be practised without these details. While a limited number of examples are disclosed, it is to be understood that there are numerous modifications and variations therefrom. Similar or equal elements in the figures may be indicated using the same numeral.

A printer uses a printing fluid, also referred to as a printing material, such as an ink or a fusing agent. The printer may be an inkjet-printer, such as a thermal inkjet-printer or a piezoelectric inkjet-printer. The volume of a drop of the printing fluid ejected when activating or energizing a print head of the printer may vary, i.e. is not constant. For example, in a thermal inkjet-printer, the drop volume, also referred to as the drop weight, of a drop ejected or fired by a nozzle of the print head may not be constant because an effectiveness of a resistor used inside the nozzle to fire the drop may degrade over the lifetime of the print head. The drop weight may also vary dependent on a firing frequency of the drops. The variation in the drop weight may cause a deterioration of an image printed. For example, when printing in a print mode defining how often a nozzle is to be fired to generate one pixel on a medium, the pixel may receive less ink over time, when compared to an initial value. When printing an image, e.g. a color image, this may result in a color loss noticeable by a user. During 3D-printing to generate an object a fusing agent is printed, however, when the amount of fusing agent reduces over time, areas in a material layer from which the object is to be generated may not be defined exactly.

To compensate for the drop volume variations a calibration process may be performed to reduce the effect of drop weight variations, both a decrease and an increase in drop weight, so that in the print mode used a print quality parameter is maintained. For example, for printing a color image, a color calibration process, such as a closed loop color calibration (CLC), may be performed to reduce or avoid color loss.

The calibration may allow compensating a certain level of drop weight variation, for example, a drop weight variation of 15%-20% from an initial or reference value. However, it was found that the drop weight may decrease up to 30% over the lifetime of a print head. The compensation may be achieved by increasing the firing frequency. The increase in firing frequency causes more drops to be fired by the print head for generating a single pixel, i.e. to fire more drops when printing a pixel within a pixel print time. Beyond the compensation limit, the printer may not be able to compensate variations in the print quality parameter, e.g. a color loss, due to drop weight variations any more so that color consistency is no longer possible. For example, a further increase in the firing frequency may not possible or lead to other effects deteriorating the printed image. The printer may perform the compensation automatically and may terminate the compensation process, for example, by stopping any further increase in the firing frequency, once the compensation limit is reached. This may happen without any notice to a user so that, eventually, the user may recognize the deterioration in the print quality, for example, which the color loss due to the drop weight variation becomes visible. In such a situation, the user has to find out the reason for the reduced print quality and what measures are to be taken to maintain the print quality. This may be difficult for users who do not have sufficient expertise.

The printer, which operating in a first print mode, may maintain the print quality parameter, such as the color consistency, despite the drop weight variations over the print head lifetime. Within a compensation range a decrease/increase in the drop weight may be compensated by an increase/decrease in the firing frequency of the print head. However, once the compensation range is fully used, i.e. a compensation limit is reached, no further compensation is possible so that eventually artifacts may become visible in the printout or, in the case of a 3-D printer, the fusing agent may not be applied exactly so that the final produce to be generated may not be within the desired limits. The printer may operate in different print modes having different compensation ranges so that drop weight variations may be compensated over a longer period of time. The compensation range may be measured in terms of the total amount of printing fluid ejected by the print head. Thus changing to another print mode may extend the compensation range of drop weight variations.

In accordance with the examples described herein, an approach is provided to allow for a compensation of drop weight variations beyond the compensation level for a first print mode by monitoring a drop volume of the printing fluid ejected by the print head, and by changing to a second print mode that maintains the print quality parameter over a longer time than the first print mode by increasing the time to print the pixel, also referred to as the pixel print time. In accordance with examples increasing the time to print the pixel may include an increase of passes of the print head across the pixel so that in the second print mode a sufficient amount of ink may be applied to the pixel without a further increase in firing frequency. In accordance with other examples, changing to the second print mode may include indicating to a printer operator or user second print modes to select from which increase the compensation range to maintain the desired print quality parameter, such as color consistency, over a longer period of time when compared to the first or currently used print mode.

FIG. 1 is a schematic representation of a printer in accordance with an example. The printer 100 includes a print head 102 including a plurality of nozzles. The print head 102 may be a thermal inkjet print head in which respective resistors are provided in the nozzles to cause ejecting a drop of an ink or other printing fluid by energizing the resistor responsive to control signals provided by a controller 104 via a line 106. The respective print head nozzles which being energized, cause the ejection of ink drops 108 to print a specific area or pixel on a print medium 110 that is suppled to the printer 100. The print head 102 may be mounted to a carriage to be moved width-wise across the print medium 110, as is indicated by the arrows pointing to the left and to the right in FIG. 1. In accordance with other examples, the printer 100 may be a pagewide array printer in which the print head is stationary and spans the entire width of the print medium 110. In accordance with other examples, the print head may be a piezoelectric print head in accordance with which the drops 108 are generated by deflecting a membrane formed in the nozzle due to the piezoelectric effect by applying an activation signal over the line 106 from the controller 104. In accordance with yet other examples, the printer 100 may be a 3-D printer, 3-dimensional printing, also referred to as additive manufacturing, rapid prototyping or solid free-form fabrication, is a technology for manufacturing a variety of objects. The printer 100 may generate objects through a selective solidification of successive layers of a build material, such as a powder material or a fiber material. A fusing agent which is applied a layer of the build material to define areas in the no-solidified build material layer to be solidified by applying energy to the layer.

In accordance with examples of the technology described herein, the printer 100 comprises the print head 102 to print a pixel. Printing the pixel includes applying an amount of printing material, such as ink, to the pixel. The amount of ink applied to the pixel is determined by the drop volume of the ink ejected from a nozzle of the print head when firing or energizing the nozzle. To print the pixel, a plurality of drops may be fired and the time until all ink drops to print the pixel are fired is also referred to as the pixel print time. The drops may be applied in a carriage printer during one pass or during a plurality of passes over the pixel. During each pass, when printing the pixel, the drops may be fired with a specific firing frequency determined by the currently used print mode. The controller 104 monitors a drop volume of the printing fluid ejected by the print head 102. When the drop volume is blow a threshold, the controller control the print head 102 in accordance with a first print mode to increase the frequency of ejecting the drops 108 of the printing fluid within the pixel print tie with a decrease in the drop volume that maintains the print quality parameter, such as color consistency. The controller 104 changes to a second print mode to maintain the print quality by increasing the pixel print time.

Figure 2:
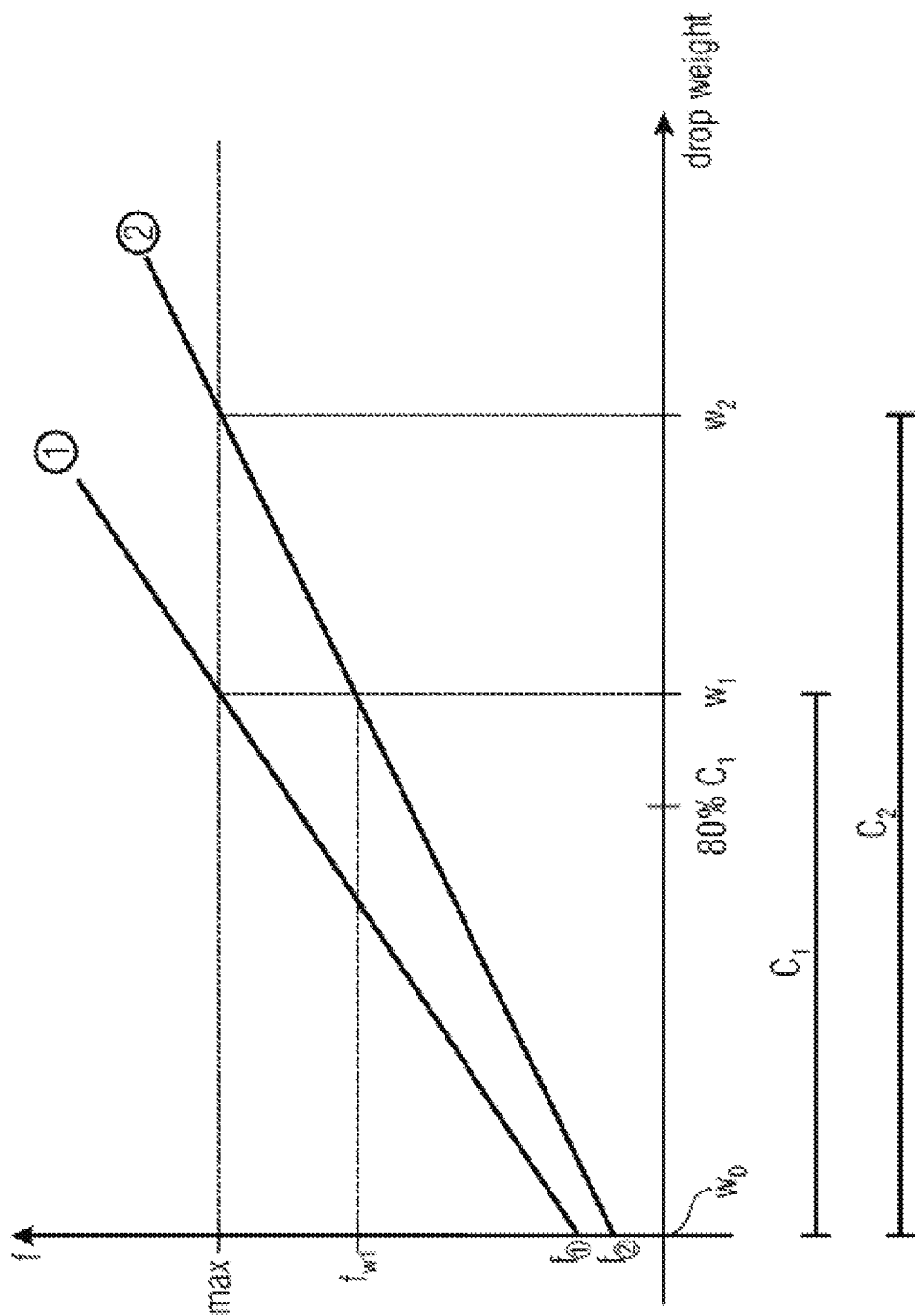
FIG. 2 is an example graph illustrating for different print modes the firing frequency vs. the drop weight.

FIG. 2 is a graph illustrating for different print modes the firing frequency vs. the drop weight. The ordinate axis indicates the firing frequency f of a print head and the abscissa axis indicates the drop weight, starting from an initial drop weight $w_0$ and indication along the abscissa axis of decrease in the drop weight. Two print modes ① and ② are indicated. For example, the print modes differ in the number of passes to print a pixel. The first print mode ① may print a pixel in 10 passes, and the second print mode ② may print the pixel in 20 passes. Initially, the first print mode ① operates at a first initial firing frequency $f_\otimes$ to obtain a print quality parameter, such as color consistency. To obtain the same print quality parameter, initially, the second print mode ② operates at a second initial firing frequency $f_\otimes$ which is lower than the first initial firing frequency $f_\otimes$ because the number of passes is higher in the second print mode ①. Over the lifetime of the print head, the drop weight decreases. Assuming that the printer operates in the first print mode ①, the drop weight decreases is compensated by an increase in the firing frequency. This is possible until the drop weight decreases from the initial weight $w_0$ to the weight $w_1$. After that, an increase in frequency may not be possible or lead to other side effects deteriorating the print out.

In accordance with examples of the technology described herein, the controller changes from the first print mode ① to the second print mode ② to maintain the print quality parameter for a longer time. For example, the controller may change to the second print mode ② when reaching the maximum firing frequency $f_{max}$. At this time, the second print mode ② may be operated at the maximum firing frequency $f_{max}$, however, since the number of passes to print the pixel is higher, the print quality parameter may be maintained as the amount of ink supplied to the pixel is maintained, despite the reduced weight, due to the increased pixel print time. Thus, as shown in FIG. 2, the print quality parameter may be maintained to the drop weight $w_2$ when changing to the second print mode ②. In other words, a compensation range is extended from a first compensation range $C_1$ compensating a drop weight reduction down to a drop weight $w_1$, to a second compensation range $C_2$ compensating a drop weight reduction down to a drop weight $w_2$. In accordance with examples, when changing to the second print mode ② the firing frequency may be reduced from $f_{max}$ to $f_{w1}$. In accordance with other examples, the print mode may change to the second print mode ② prior to reaching the maximum firing frequency $f_{max}$. For example, the change may occur when a defined percentage, such as 80%, of the compensation range $C_1$ is used. In accordance with yet other examples, the controller may allow a user to change to the second print mode ② at any time during the first compensation range $C_1$. In this case, the controller may indicate to the user the percentage of the compensation range $C_1$ already used, and, responsive to a user input, cause the change in the print mode. The printer may be a carriage printer and the pixel print time, i.e. the time to completely print a pixel in accordance with the desired print out, may be increased by increasing the number of passes of the print head 102 across the pixel. In accordance with other examples, the time to print a pixel may be increased by decreasing the speed of moving the print head 102 across the medium 110. In case of a pagewide array printer, the increase of the pixel print time may be achieved by decreasing the speed of moving the medium 110 past the print head 102. In accordance with examples, the printer of FIG. 1 allows for an extension of the CLC correction margin beyond the 15% or 20% drop weight reduction described above.

Figure 3:
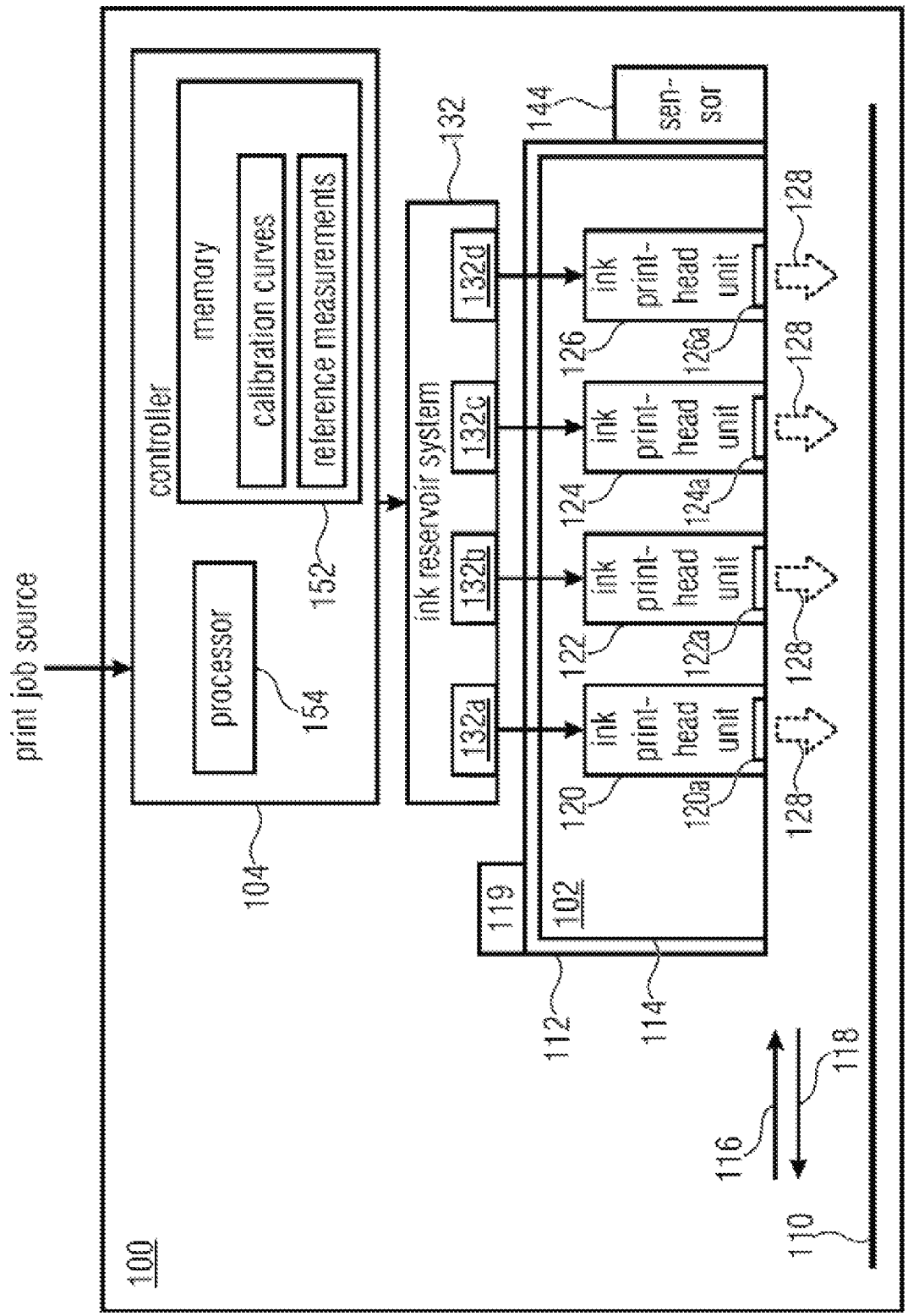
FIG. 3 shows a carriage inkjet-printer in accordance with another example.

FIG. 3 shows a carriage inkjet-printer in accordance with another example. The printer 100 includes a carriage 112 with a print head receiving assembly 114 to receive the print head 102. The carriage 112 is to transition the print head 102 across the width of the print medium 110, also referred to as a substrate, along the print head transition directions 116, 118. For example, a drive 119 may be coupled to the carriage 112 to effect the carriage transition. The printer 100 may perform printing across the width of the medium 110 by a corresponding translation of the carriage 112. In the example of FIG. 3, the print head 102 includes a plurality of ink print head units 120 to 126. Each of the ink print head units 120 to 126 includes respective ink nozzle array arrangements 120a to 126a to eject ink drops 128. The ink print head units 120 to 126 are fluidically connected to an ink reservoir system 132. The ink reservoir system 132 includes ink reservoirs 132a to 132d for providing ink to the respective ink print head units. In accordance with examples, the ink reservoirs 132a to 132d may store cyan ink, magenta ink, yellow ink and black ink. Base colors may be reproduced on the medium 110 by depositing a number of ink drops of one of the inks at a specific medium location, also referred to as a pixel. Other colors may be reproduced by combining inks from different ink print head units, for example, by depositing drops of different base colors on adjacent dot locations in the pixel. In accordance with other examples, less ink print head units as depicted in FIG. 3 or more ink print head units and associated ink reservoirs may be provided, for example, a CcMmKY printer may include further ink reservoirs for light cyan (c) and light magenta (m). The reservoirs may be mounted on the carriage 112 in a position adjacent to the respective print heads. In accordance with other examples, the reservoirs may not be mounted on the carriage 112 and may be connected to the print head units on the carriage by means of a fluid supply. Such a system is also referred to as an off-axis system. In accordance with other examples, fluids different from inks may be provided through one of the print heads or by print head units, for example, a pre-treatment fluid, such as a fixer, and/or a post-treatment fluid, such as a coating.

The print head units may be monolithically integrated in the print head or may be modularly implemented in the print head so that each print head unit 120 to 126 may be individually replaced. The print head 102 may be a disposable print element or a fixed print element designed to last for the whole operating life of the printer 100.

The printer 100 includes a sensor 144 attached to the carriage 112 to move together with the carriage 112. The sensor 144 may be provided to measure a colorimetric parameter associated with an ink drop number, such as lightness, chroma values or optical density. The sensor 144 may measure values of the colorimetric parameter on medium locations or pixels across the medium 110. In accordance with examples, the sensor 144 may include a spectrophotometer, a densitometer or any other sensor for measuring a colorimetric parameter.

The controller 104 of the printer 100 is operatively connected to the previously described elements of the printer. The controller 104 includes a memory 152 and a processor 154 to process print jobs received from a print job source. The memory 152 may include computer readable instructions for controlling the processor 154 to execute methods as described herein.

Figure 4:
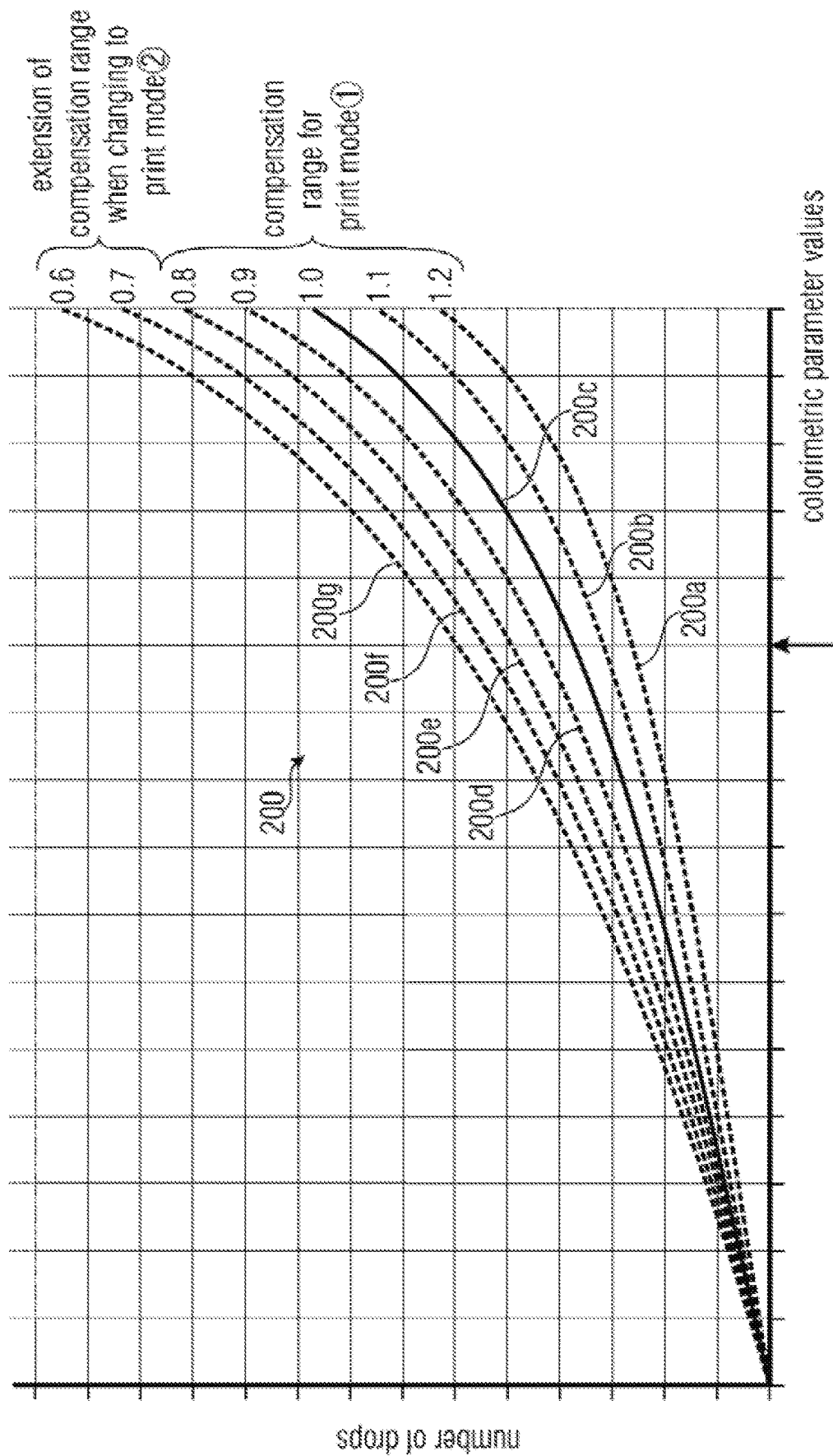
FIG. 4 illustrates an example of a set of calibration curves obtained by a CLC process.

The printer 100 may perform a closed loop color calibration to compensate for drop weight variations by modifying respective tables for each color and medium. In accordance with the CLC process, the printer 100 may store in the memory 152 information representing calibration curves and reference measurements. The calibration curves are generated using the reference measurements, for example, when operating the printer for the first time, either by a user or at the end of manufacturing process. In accordance with the CLC process, patches or patterns of ink from the various ink print head units 120 to 126 are printed, and a measurement of a colorimetric parameter to determine a print quality parameter is performed. The measurements are stored as reference measurements in the memory 152. A set of calibration curves is generated using the reference measurements taken at the beginning of the lifetime of the printer. The set of calibration curves is to cover drop weight variations that a printer may be expected to produce over its whole operational life. FIG. 4 illustrates an example of a set 200 of calibration curves 200a to 200g, also referred to as linearizations obtained by the CLC process. The ordinate axis 204 indicates a number of drops, and the abscissa axis 206 indicates a value of a specific colorimetric parameter. The colorimetric parameter may represent a measurement of the lightness. FIG. 4 illustrates, for each calibration curve, the number of ink drops for a specific colorimetric parameter value to be achieved in a printout. Each of the curves indicates a specific drop weight. The curve 200c indicates the reference curve at which the drop weight is 1, the curves 200a and 200b indicate an increase in drop weight to 1.1 and 1.2 times the reference drop weight, respectively, and the curves 200d to 200f indicate a reduction in the drop weight to 0.8, 0.9, 0.7 and 0.6 times the reference drop weight, respectively. The calibration curves may be for a specific ink to be printed, for a specific medium to be printed on, or for a combination thereof, and the memory 152 may hold a plurality of such calibration curve sets 200 for different inks, media and combinations of ink/media.

In FIG. 4, the calibration curves, stored in the memory, e.g., as linearization tables, do not discriminate between print modes. To achieve the predefined colorimetric property, the same amount of ink or the same number of drops has to be laid down on the medium no matter what print mode is used. The drop weight loss compensation as provided in accordance with the techniques described herein, extends the compensation range by changing to another print mode using, e.g., more passes than a currently used print mode. Because the amount of drops to be fired to maintain the colorimetric parameter is higher to compensate the drop weight loss, the other print mode with more passes may be used and so less firing frequency restrictions apply. In accordance with an example, the currently used first print mode may be the first print mode ① referred to in FIG. 2, and the other print mode may be the second print mode ② referred to in FIG. 2. The first print mode ① may allow for an increase in firing frequency such that a compensation of a drop weight reduction may be achieved in a range of about 20% around the reference value. For the first print mode ① the calibration curves 200a and 200e indicate the compensation limit calibration curves, also referred to as the compensation range for the first print mode ①. The second print mode ② may allow for an increase in firing frequency such that a compensation of a drop weight reduction may be achieved in a range of about 40% around the reference value, which may cover the entire range of drop weight reduction experienced over a lifetime of the print head. For the second print mode ② the calibration curves 200a and 200g indicate the compensation limit calibration curves, also referred to as the compensation range for the second print mode ②.

In accordance with examples described herein, the printer depicted in the examples of FIG. 1 or FIG. 3 may operate in the first print mode ①, and monitors a drop volume of the printing fluid ejected by the print head. The monitor the drop volume, the controller 104 may control the print head 102 to print out a pattern corresponding to the pattern also used for generating the reference measurements. The sensor 144 performs actual measurements of the colorimetric parameter. The processor 154 of the controller 104 compares the actual measurements and the reference measurements to determine a decrease in the drop volume or drop weight of the ink drops 128 ejected by the print head 102. The controller 104 may determine for a plurality of values obtained during the actual measurement the decrease in drop weight and may generate an additional calibration curve by interpolating the calibration curves stored in the memory 152. For example, when considering a drop weight to be reduced from 1.0 to 0.85, a new calibration curve is generated using the calibration curves 200d and 200e to represent the new drop weight. For the further printing in the corresponding print mode, the newly generated calibration curve is used to determine the number of drops to obtain a constant value for the colorimetric parameter. The controller determines for the first print mode ①, using the new, reduced drop weight, the amount of compensation range between the reference curve 1.0 and the calibration curve 0.8 that was used for compensating. For example, when a drop weight of 0.85 is determined, 15% of the 20% range is used up for the first print mode ①, i.e. 75% of the available compensation range or compensation budget was used. This may be signaled to the printer operator. The controller may provide the printer operator or user with a new print mode which may have a higher number of passes, such as the print mode ②, for printing a single pixel, so that the number of drops may be further increased, e.g., using the extended compensation range in FIG. 4, until a maximum firing frequency is reached. For example, when the correction margin of 15% or 20% of the drop weight for the first print mode ① is consumed, a list of new print modes may be provided to the user by the controller, together with an indication of the print head life extension period, for example, in terms of ink ejected measured in liters.

FIG. 4 indicates the compensation range for the first print mode ①, and the extension of the compensation range when changing to the second print mode ② using an increased number of passes for printing a pixel when compared to the first print mode ①. The second print mode ② operates at a reduced firing frequency, but to eject the same number of drops for obtaining the same value of the colorimetric measure as the first print mode, more time is used when compared to the first print mode to complete the pixel. However, the color consistency may be maintained beyond the compensation limit of the first print mode ①.

For example, a new print mode may extend the current limit for maintaining the desired value of the colorimetric measure, which may be indicated as 3.2 liters of ink, to a new limit, which may be indicated as 3.6 liters of ink. In accordance with examples, more than one new print mode may be presented, for example, a print mode indicating that 12 passes over the same pixel leads to a lifetime of the compensation of 4.2 liters of ink processed by the print head, or another print mode indicating that 16 passes extend the compensation lifetime to 5.4 liters of ink.

In accordance with examples, the monitoring of the drop volume may occur at fixed instances of time, for example, after a predefined number of print operations, after the lapse of a specific time period, any time the printer is turned on or combinations thereof. In accordance with examples, the user may be provided with the amount of compensation budget already used up by the current print mode every time a new measurement/calibration is performed or once a specific amount of the budget was used, for example, when a measurement indicates that the compensation budget used is 80%, i.e. 20% compensation range remains. In accordance with yet other examples, the user who decides not to accept the new print mode may be signaled by the controller, once the compensation range is completed, that the compensation is no longer possible so that the user may then select at any time after the completion of the compensation range, a new print mode allow a compensation during the new print mode.

The above described approach provides a print head health versus color consistency feedback to the printer user, allows the increase of the print head life during which the color consistency is met, especially in situations in which the overall system is not able to compensate for all print modes.

Figure 5:
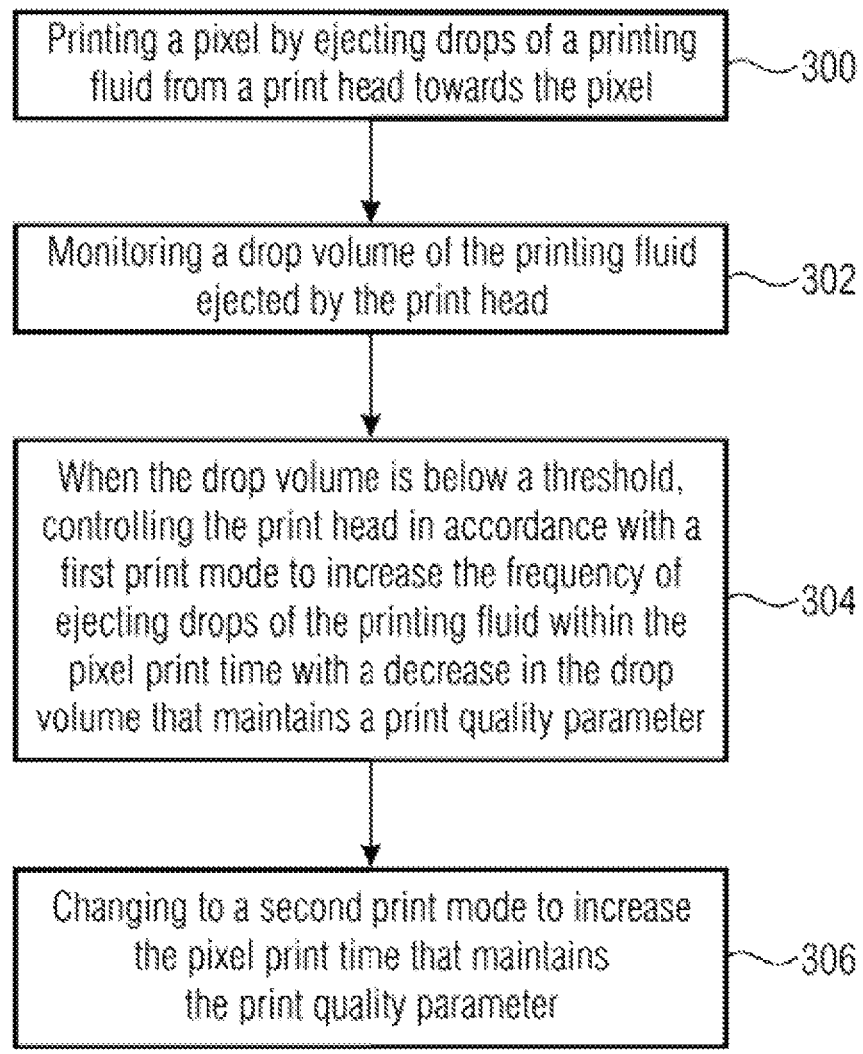
FIG. 5 is a flow diagram of an example of a method described herein.

FIG. 5 is a flow diagram of an example of a method described herein. A pixel is printed 300 by ejecting drops of a printing fluid from a print head. The drop volume of the printing fluid ejected by the print head is monitored 302. When the drop volume is below a threshold, the print head is controlled 304 in accordance with a first print mode to increase the frequency of ejecting drops of the printing fluid within the pixel print time with a decrease in the drop volume that maintains a print quality parameter. A change 306 to a second print mode is performed to increase the pixel print time that maintains the print quality parameter.

Although some aspects of the techniques described herein are described in the context of an apparatus, these aspects may also represent a description of the corresponding method, where a block or device corresponds to a method block or a feature of a method block. Analogously, aspects described in the context of a method also represent a description of a corresponding block or item or feature of a corresponding apparatus.

Examples described herein may be realized in the form of hardware, machine readable instructions or a combination of hardware and machine readable instructions. Any such machine readable instructions may be stored in the form of volatile or non-volatile storage, for example, a storage device such as a ROM, whether erasable or rewritable or not, or in the form of a volatile memory, for example, RAM, memory chips device or integrated circuits or an optically or magnetically readable medium, for example, a CD, DVD, magnetic disc or magnetic tape. The storage devices and storage media are examples of machine readable storage that is suitable for storing a program or programs that, when executed, implement examples described herein.

All of the features disclosed in this specification, including any accompanying claims, abstract and drawings, and/or all of the method or process so disclosed may be combined in any combination, except combinations where at least some of the features are mutually exclusive. Each feature disclosed in this specification, including any accompanying claims, abstract and drawings, may be replaced by features serving the same, equivalent or similar purpose, unless expressly stated otherwise. Thus unless expressly stated otherwise, each feature disclosed is one example of a generic series of equivalent or similar features.

The invention claimed is:

1. A printer, comprising:
a print head to print a pixel by ejecting drops of a printing fluid from the print head, a controller to
monitor a drop volume of the printing fluid ejected by the print head,
when the drop volume is below a threshold, control the print head in accordance with a first print mode to increase the frequency of ejecting drops of the printing fluid within a pixel print time with a decrease in the drop volume that maintains a print quality parameter, and
change to a second print mode to increase the pixel print time that maintains the print quality parameter over a longer period of time than the first print mode.

2. The printer of claim 1, wherein
the frequency of ejecting drops of the printing fluid within the increased pixel print time is reduced when changing to the second print mode, and
the second print mode to increase the frequency of ejecting drops of the printing fluid during the increased pixel print time with a further decrease in the drop volume.

3. The printer of claim 1, wherein increasing the pixel print time includes an increase of the number of passes of the print head across the pixel, a decrease of a speed of moving the print head across a medium, or a decrease of a speed of moving the medium past the print head.

4. The printer of claim 1, wherein to monitor the drop volume the controller is to
cause printing of a pattern in accordance with the currently used print mode,
obtain actual measurements of the print quality parameter from the pattern, and
compare the actual measurements of the print quality parameter and reference measurements to determine a decrease in the drop volume.

5. The printer of claim 4, wherein
in a currently used print mode the print quality parameter is maintained with the increase in the frequency over an initial compensation range of drop volumes, the initial compensation range extends from a reference drop volume to a compensation drop volume,
the controller is to determine a remaining compensation range using the decreased drop volume, the remaining compensation range extends from the decreased drop volume to the compensation drop volume, and
the controller is to determine the threshold using a comparison of the initial compensation range and the remaining compensation range.

6. The printer of claim 5, wherein
a plurality of calibration curves are provided, each calibration curve indicates for a drop volume a plurality of values of the print quality parameter versus a number of drops of the printing fluid to be ejected to obtain the print quality parameter, and
the controller is to interpolate calibration curves for those drop volumes between which the decreased drop volume lays to determine a new calibration curve for the decreased drop volume.

7. The printer of claim 4, comprising a closed-loop system including a color measurement device to measure the print quality parameter.

8. The printer of claim 1, wherein the controller is to indicate to a printer operator the second print mode and to change to the second print mode responsive to an input by the printer operator.

9. The printer of claim 8, wherein the controller is to
indicate a plurality of print modes to select the second print mode from,
indicate for each print mode an increase of the life time of the print head during which a decrease in the drop volume is compensated to maintain the print quality parameter,
receive a print mode selection from the printer operator, and
control the print head in accordance with the selected second print mode.

10. The printer of claim 1, wherein
the controller is to indicate to the printer operator the second print mode when the threshold is reached, or at any time before or after the threshold is reached.

11. The printer of claim 1, wherein
the drop volume is represented by a weight of the drop of the printing fluid ejected by a nozzle of the print head when energizing the nozzle, and
the print quality parameter includes a color consistency.

12. The printer of claim 1, wherein
the printer includes an inkjet-printer,
the inkjet-printer includes a carriage inkjet-printer or a page wide array inkjet-printer,
the inkjet-printer includes a thermal inkjet-printer or a piezoelectric inkjet-printer, and
the printing fluid includes an ink.

13. The printer of claim 1, wherein
the printer includes a 3D-printer,
the printer includes a carriage 3D-printer or a page wide array 3D-printer, and
the 3D-printer includes a thermal 3D-printer or a piezoelectric 3D-printer, and
the printing fluid includes fusing agent.

14. A method, comprising:
printing a pixel by ejecting drops of a printing fluid from a print head,
monitoring a drop volume of the printing fluid ejected by the print head,
when the drop volume is below a threshold, controlling the print head in accordance with a first print mode to increase the frequency of ejecting drops of the printing fluid within a pixel print time with a decrease in the drop volume that maintains a print quality parameter determined using a colorimetric parameter measurement of the printed pixel, and
changing to a second print mode to increase the pixel print time that maintains the print quality parameter over a longer period of time than the first print mode.

15. A non-transitory machine-readable storage medium comprising instructions executable by a processing resource of a computing device to cause the processing resource to:
fire drops of a printing fluid from a print head to print a pixel,
monitor a drop volume of the printing fluid ejected by the print head,
when the drop volume is below a threshold, in accordance with a first print mode increase a frequency of firing the drops of the printing fluid within a pixel print time with a decrease in the drop volume that maintains a print quality parameter, and
change to a second print mode to increase the pixel print time that maintains the print quality parameter over a longer period of time than the first print mode.

* * * * *